Sept. 2, 1969             F. MAYO             3,464,833
FROZEN FOOD PACKAGE AND METHOD
OF PACKAGING FROZEN FOOD
Filed Aug. 23, 1965

INVENTOR.
FLETCHER MAYO
BY Fetherstonhaugh & Co
ATTORNEYS

United States Patent Office 3,464,833
Patented Sept. 2, 1969

3,464,833
FROZEN FOOD PACKAGE AND METHOD OF PACKAGING FROZEN FOOD
Fletcher Mayo, Bulls Cove, Newfoundland, Canada, assignor to Fishery Products Limited, St. John's, Newfoundland, Canada
Filed Aug. 23, 1965, Ser. No. 481,793
Claims priority, application Canada, Jan. 23, 1965, 921,488
Int. Cl. B65b 25/06
U.S. Cl. 99—174      1 Claim

ABSTRACT OF THE DISCLOSURE

This invention relates to a paperboard frozen food package of the type that is commonly packed with an unfrozen food of a wet and irregular nature, compressed and then frozen. Fish is normally packed in this way. Difficulty is often encountered in evacuating air from between the separate pieces of food product being packed because the package interior seals to the fish or other product as it is compressed thereagainst and the air cannot escape as it is forced from the food product. This invention contemplates the formation of the interior of the paperboard package with a plurality of depressions whereby the surface is made irregular. The depressions are spaced apart to prevent the surface from sealing against the product on contact therewith so that the interior surface of the paperboard carton is an air escape path in use as the product is compressed.

---

This invention relates to a package for packaging fish and other like food products for freezing and its manner of use. The invention will be described in relation to the fish packing industry, but it will be apparent that its application could be extended to other food products and it is not intended that the invention be restricted to the packaging of fish.

It is common in the fish trade to press and then freeze fresh fish in large blocks for subsequent cutting into smaller pieces for consumer marketing. A common block size is about 19 inches by 10 inches by 2¼ inches.

The general method of packaging comprises the steps of placing an open top metal pan on a work table and lining it with an open paperboard package. The package is then filled with unfrozen fish and closed. Following this, the metal pan containing the box of fish is placed between the platens of a plate freezer and the top platen of the freezer is brought down over the cover to compress the fish and shape it into a block having the general dimensions of the pan. It is maintained between the platens for a period of about 2½ hours to reduce it to a temperature of about −42° F. The package of frozen fish is then removed for storage and/or shipment.

Usually the blocks of fish so frozen are cut, in the frozen condition, into smaller pieces for consumer sale. In the past, considerable difficulty has been experienced with this "pan block" method of freezing as a result of air voids in the block of fish. As the fish is compressed, air is entrapped therein and forms voids. These voids result in spaces so that many of the smaller pieces into which the block is cut have to be discarded as imperfect. Loss by reason of waste is heavy and careful inspection of the product is necessary to insure absence of voids.

Prior attempts have been made to relieve the air voids from the fish during the packing process, but they have all been unsuccessful and/or unacceptable to the trade. One prior attempt comprised the perforating of the package to permit the air to escape from the compressed fish.

This solved the problem of air voids in the fish but left a portion of the fish block at the holes exposed, with the result that the product dehydrated during storage. Attempts to solve the problem have also included the knurling of the carton interior, the idea being that the knurl would provide channels for the air driven from the fish by compression to disperse. Tests have shown that the depth of knurl necessary cuts so deeply into the board that air can pass through the board and dehydration of the fish is again greater than the fish trade will accept.

It is an object of this invention to overcome the difficulty of air void formation in pan blocks of fish and to thereby reduce waste of product in subsequent processing and to avoid the necessity of undue inspection of the product for air voids.

With these and other objects in view, this invention comprises a package for fish or the like for use with a pan block that diminishes the occurrence of air voids. The package comprises an open body having a cover, the body being made essentially of a paperboard with a barrier coating and having an interior surface with spaced apart depressions, the depressions being spaced apart to constitute the said interior surface an escape path to the edge of the package for air as product is compressed thereagainst in use. The invention will be clearly understood after reading the following detailed description read in conjunction with the drawings.

Figure 1:
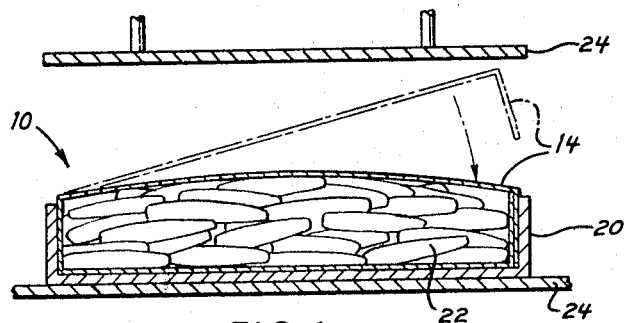
FIGURE 1 is a sectional view of a container of fish between the platens of a plate freezer press about to be compressed.
Figure 2:
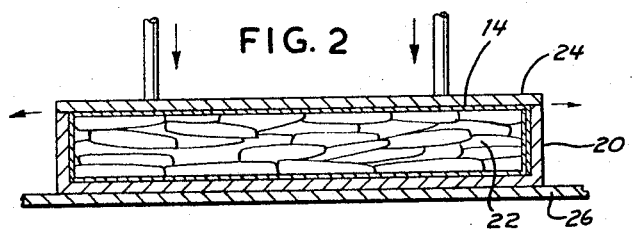
FIGURE 2 is a view similar to FIGURE 1 but showing the fish compressed.

Referring to the drawings, the numeral 10 indicates generally a fish package according to this invention. It is made from paper hard board, waxed on both sides, and has a body 12 with a folding top closure 14 that has flaps adapted to overlie the outside of the body portion.

The paperboard of the package has a relief interior surface with spaced apart depressions 16. Depressions 16 are preferably formed into the paperboard before the package is formed and after the wax coating has been applied thereto to provide a barrier that will give a package with good storage qualities. The coating can be wax or a synthetic resin and is applied of a thickness to achieve the required storage qualities according to standard practice. In the fish industry the barrier is thick enough to protect the board from the moisture of the fish and to keep the frozen product from dehydration damage for a period of about 6 to 8 months. The depressions 16 are spaced apart, as will be described later, to constitute the surface area therebetween an escape path to the edge of the package for air as fish is compressed thereagainst in use. The depressions also absorb air forced from the product as the product is compressed thereagainst in use.

Figures 3, 4:
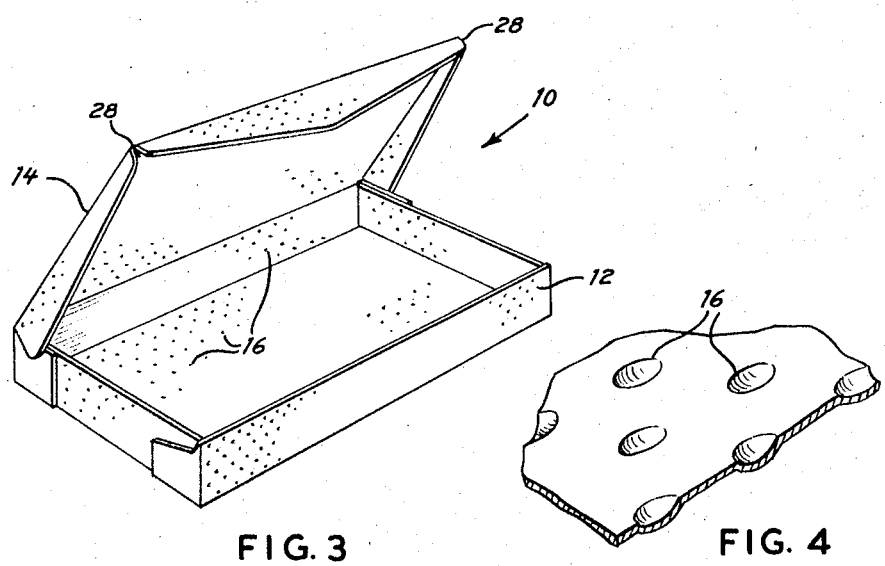
FIGURE 3 is a perspective view of an empty fish package according to this invention.
FIGURE 4 is a fragmentary view of the container illustrating the embossing.

FIGURE 4 illustrates a fragmentary portion of the package 10. It shows the depression 16 in the board from which the carton is made. These depressions are elongated in form and have, in the embodiment of the invention illustrated, a length of about ⅛ of an inch, are spaced apart from each other in longitudinally extending rows at a distance of about 3⁄16 of an inch and have a depth of about 1⁄64 of an inch. The inner surface of the carton is shown face up in FIGURE 4, and it will be noted that the longitudinally extending rows of depressions are staggered laterally of the package. The package illustrated has a length of about 19 inches, a width of about 10 inches and a depth of about 2¼ inches.

This package is used in combination with a rigid pan which has a depth of about 3/32 of an inch less than the depth of the package. The package is in use placed in the pan 20 and filled with unfrozen fish fillets 22, as indicated in FIGURE 1. The top closure of the package is then folded down over the sides of the body portion and the package is placed between the platens 24 and 26 of a plate freezer. The quantity of fish 22 placed in the package is sufficient to fill it when compressed and to this end the platens of the plate freezer are brought together to compress the unfrozen fish to occupy the package. It will be recalled that the package is slightly deeper than the pan 20, so that the platens can compress the fish within the package to force it into all corners thereof as the package yields this limited amount. As the fish is compressed, air is exhausted from the spaces therebetween and is forced to the interior walls of the package. The depression 16 formed in the interior walls of the package prevent the fish that is forced thereagainst from sealing therewith and instead constitute the surface of the package an air path to the edge of the package for the escape of the air that is driven from the product during compression. It will be noted that the corners of the package are opened as at 28 to facilitate the egress of air at the edge of the package.

The general method of compresing fissh between the platens of a freezer press in a pan 20 as illustrated is, as indicated above, well known and detailed reference to it is not thought necessary. Once compressed, the fish is frozen by the application of a plate temperature of about −42° F. for a period of about 2½ hours.

As indicated above, previously difficulty has been encountered in the evacuation of the air contained in the unfrozen fish. With a smooth walled package the fish tends to seal against the inside of the package and prevent the escape of the air. Previous attempts at relieving the air have involved a foraminous package of some form, and these have been unacceptable to the trade because the freezing and storage qualities of the package are not high enough. This is a tendency for freezer burn to occur at the openings and there is a tendency for the fish to dehydrate at the exposed portions with storage. The package of this invention overcomes these difficulties.

The essential feature of this invention is a formation of a surface on the inside of the package which does not affect in any way its imperviability and against which the fish will not seal as it is compressed and which will permit the escape of air thereover to the edge of the package as the unfrozen fish is compressed.

The paperboard from which the package is made is, according to standard practice, waxed on both sides and at the edges so that it will not absorb water during the fish packing.

Embodiments of the invention other than the one illustrated will be apparent to those skilled in the art, and it is not intended that the foregoing description should be read in a limiting sense.

What I claim as my invention is:

1. A method for packaging a fish product, for freezing comprising: the steps of taking a plate freezer press; taking an open forming pan; taking a package having a body with a cover therefor and being adapted to fit into said forming pan, said package having a height slightly higher than the height of said forming pan; said package being formed from a paperboard with a barrier coating and having an interior surface made irregular by depressions spaced to prevent the surface from sealing with product on contact and to constitute the said interior surface an escape path to the edge of said package for air as product is compressed thereagainst in use; containing said package in said forming pan with the cover thereof open, placing product in said package, closing said package, compressing said package between the platens of said plate freezer to cause said product to fill said package and to drive air from said product and across the said irregular interior surface of said paperboard package to the exterior sense thereof.

References Cited
UNITED STATES PATENTS

| | | | |
|---|---|---|---|
| 1,773,080 | 8/1930 | Birdseye | 99—194 |
| 2,778,173 | 1/1957 | Taunton | 53—22 |
| 3,269,846 | 8/1966 | Wattenbarger | 99—174 |
| 3,040,948 | 6/1962 | Wells | 229—2.5 |
| 3,067,921 | 12/1962 | Reifers | 229—2.5 |
| 3,218,178 | 11/1965 | Pava | 99—171 |

LIONEL M. SHAPIRO, Primary Examiner

WILLIAM C. LAWTON, Assistant Examiner

U.S. Cl. X.R.

99—195